US008552656B2

(12) United States Patent
Choi et al.

(10) Patent No.: US 8,552,656 B2
(45) Date of Patent: Oct. 8, 2013

(54) AC LIGHT EMITTING DEVICE, DRIVING DEVICE THEREOF, AND DRIVING METHOD THEREBY

(75) Inventors: Byung Hoon Choi, Ansan-si (KR); In Kyu Park, Ansan-si (KR); Do Hyung Kim, Ansan-si (KR)

(73) Assignee: Seoul Semiconductor Co., Ltd., Seoul (KR)

( * ) Notice: Subject to any disclaimer, the term of this patent is extended or adjusted under 35 U.S.C. 154(b) by 249 days.

(21) Appl. No.: 13/130,020

(22) PCT Filed: Nov. 6, 2009

(86) PCT No.: PCT/KR2009/006524
§ 371 (c)(1),
(2), (4) Date: Aug. 3, 2011

(87) PCT Pub. No.: WO2010/058923
PCT Pub. Date: May 27, 2010

(65) Prior Publication Data
US 2011/0279047 A1   Nov. 17, 2011

(30) Foreign Application Priority Data
Nov. 19, 2008   (KR) .................. 10-2008-0115251

(51) Int. Cl.
*H05B 39/00*   (2006.01)
(52) U.S. Cl.
USPC ........... 315/201; 315/246; 315/291; 315/312; 315/322
(58) Field of Classification Search
USPC .................. 315/291, 246, 227 R, 312, 322
See application file for complete search history.

(56) References Cited

U.S. PATENT DOCUMENTS

| | | | |
|---|---|---|---|
| 7,791,285 B2* | 9/2010 | Wu | 315/227 R |
| 2003/0122502 A1 | 7/2003 | Clauberg et al. | |
| 2008/0252229 A1 | 10/2008 | Wu | |
| 2011/0175537 A1* | 7/2011 | Horng et al. | 315/193 |
| 2011/0260633 A1* | 10/2011 | Takeda et al. | 315/192 |
| 2012/0299497 A1* | 11/2012 | Lee et al. | 315/210 |

FOREIGN PATENT DOCUMENTS

JP   2004-296205   10/2004

OTHER PUBLICATIONS

International Search Report of International Application No. PCT/KR2009/006524 issued on May 31, 2010.
Written Opinion of International Application No. PCT/KR2009/006524 issued on May 31, 2010.

* cited by examiner

*Primary Examiner* — Jason M Crawford
(74) *Attorney, Agent, or Firm* — H.C. Park & Associates, PLC

(57) ABSTRACT

An AC light emitting device, a driving device thereof and a driving method are disclosed. The driving device includes a sub-driving part turned on corresponding to each of positive and negative voltage regions of an AC voltage source to provide current paths for operating at least two LEDs, and a free-charge part charging with a voltage to be supplied to one of the at least two LEDs which is not operated while the other LED is operated by the sub-driving part. The AC light emitting device, the driving device thereof and the driving method thereby can solve problems, such as a decrease in power factor, severe total harmonic distortion, excessive flickering, and the like, due to operating characteristics of the AC light emitting device by application of an AC voltage source thereto.

30 Claims, 4 Drawing Sheets

AC LIGHT EMITTING DEVICE, DRIVING DEVICE THEREOF, AND DRIVING METHOD THEREBY

CROSS-REFERENCE TO RELATED APPLICATIONS

This application is the National Stage Entry of International Application PCT/KR2009/006524, filed on Nov. 6, 2009, and claims priority from and the benefit of Korean Patent Application No. 10-2008-0115251, filed on Nov. 19, 2008, both of which are incorporated herein by reference for all purposes as if fully set forth herein.

BACKGROUND OF THE INVENTION

1. Field of the Invention

The present disclosure relates to alternating current (AC) light emitting devices and, more particularly, to an AC light emitting device operated by an AC voltage source, a driving device thereof, and a driving method thereby.

2. Discussion of the Background

A highly integrated light emitting diode (LED) chip or package includes a plurality of LED cells connected to each other and generally undergoes an increase of a threshold voltage in proportion to the number of LED cells connected to each other in a forward direction when used with an AC voltage source.

FIGS. 1 and 2 are circuit diagrams explaining problems of a conventional AC LED.

FIG. 1 is an equivalent circuit diagram where an AC LED 10, an AC voltage source $V_{ac}$, and a resistor $R_1$ are connected in series to one another. In the AC LED 10, an LED cell 12 is operated in a positive half-period of the AC voltage source $V_{ac}$ and an LED cell 14 is operated in a negative half-period of the AC voltage source $V_{ac}$. The current across the AC LED 10 is dependent on the resistor $R_1$.

FIG. 2 is a graph depicting a voltage-current waveform of the AC LED shown in FIG. 1, in which $g_1$ is a voltage curve of the AC voltage source $V_{ac}$ and $g_2$ is a current curve of the current across the AC LED 10 in FIG. 1. The x-axis indicates time and the y-axis indicates voltage or current.

Referring to FIGS. 1 and 2, in the positive half-period of the AC voltage source $V_{ac}$, a current is allowed to flow and the LED cell 12 emits light when the voltage is greater than or equal to the forward threshold voltage of the LED cell 12. Similarly, in the negative half-period of the AC voltage source $V_{ac}$, a current is allowed to flow and the LED cell 14 emits light when the voltage is greater than or equal to the forward threshold voltage of the LED cell 14.

Such characteristics of the AC LED 10 operated only by application of the voltage greater than or equal to the forward threshold voltage cause several problems. In other words, when the applied voltage is greater than or equal to the forward threshold voltage of the LED cell 12 or 14 connected in the forward direction with respect to the applied voltage, an avalanche current flows through the AC LED 10 and a short operating region is provided to the AC LED 10 for a single period of the AC voltage source applied thereto, thereby causing a low power factor, an increase in total harmonic distortion (THD) (particularly, third-order harmonic distortion), excessive flickering, and deterioration in optical efficiency.

SUMMARY OF THE INVENTION

An aspect of the present disclosure is to provide an AC light emitting device, a driving device thereof, and a driving method thereby, which solve problems such as low power factor, increase in total harmonic distortion, flickering, and deterioration in optical efficiency due to the operating characteristics of the AC LED during application of an AC voltage source.

In accordance with an aspect, a driving device for light emitting diodes (LEDs) includes a free-charge part charging with a voltage to be supplied to one of at least two LEDs which is not operated while the other of the at least two LEDs is operated by application of an AC voltage source.

The voltage may be greater than or equal to a forward threshold voltage of the one LED which is not operated, and may be supplied to an anode-terminal of the one LED.

The driving device may further include a sub-driving part which is turned on corresponding to each of a positive voltage region and a negative voltage region of the AC voltage source to provide current paths for driving the LEDs.

The free-charge part may include a first charge part charging with a positive voltage in a positive voltage region of the AC voltage source; and a second charge part charging with a negative voltage in a negative voltage region of the AC voltage source.

The first charge part may include a first rectifier turned on in the positive voltage region of the AC voltage source and a first capacitor charging while the first rectifier is turned on.

The second charge part may include a second rectifier turned on in the negative voltage region of the AC voltage source and a second capacitor charging while the second rectifier is turned on.

The driving device may further include a current control part connected between the AC voltage source and the LEDs to control a current applied to the LEDs in accordance with temperature variation of the LEDs.

The current control part may include a thermistor which reduces the current applied to the LEDs as the temperature of the LEDs is increased.

In accordance with another aspect, an AC light emitting device includes: a light emitting part including at least two LEDs operated by an AC voltage source; and a driving part driving the LEDs upon application of the AC voltage source to the driving part while charging with voltage to be supplied to one of the at least two LEDs which is not operated while the other of the at least two LEDs is operated.

The voltage may be greater than or equal to a forward threshold voltage of the one LED which is not operated, and may be supplied to an anode-terminal of the one LED.

The driving part may include: first and second drivers separately turned on corresponding to each of a positive voltage region and a negative voltage region of the AC voltage source to provide current paths for the LEDs; and a free-charge part charging with a voltage greater than or equal to a forward threshold voltage of the first LED in the positive voltage region of the AC voltage source where the first LED is not operated, the voltage being supplied to the first LED before operation of the first LED by application of a negative voltage after the positive voltage region, and charging with a voltage greater than or equal to a forward threshold voltage of the second LED in the negative voltage region of the AC voltage source where the second LED is not operated, the voltage being supplied to the second LED before operation of the second LED by application of a positive voltage after the negative voltage region.

The free-charge part may include a first charge part charging in the positive voltage region of the AC voltage source to supply the voltage, which is greater than or equal to the forward threshold voltage of the first LED, to the first LED before operation of the first LED by application of the negative voltage; and a second charge part charging in the negative voltage region of the AC voltage source to supply the voltage, which is greater than or equal to the forward threshold voltage of the second LED, to the second LED before operation of the second LED by application of the positive voltage.

The first charge part may include a first rectifier turned on in the positive voltage region of the AC voltage source and a first capacitor charging while the first rectifier is turned on.

The second charge part may include a second rectifier turned on in the negative voltage region of the AC voltage source and a second capacitor charging while the second rectifier is turned on.

The AC light emitting device may further include a current control part connected between the AC voltage source and the light emitting part to control a current applied to the light emitting part in accordance with temperature variation of the light emitting part.

The current control part may include a thermistor which reduces the current applied to the LEDs as the temperature of the LEDs is increased.

In accordance with a further aspect, an AC light emitting device includes: a light emitting part including at least first and second LEDs operated by an AC voltage source; a first driving part operating the first LED in a positive voltage region of the AC voltage source; a first charge part charging with a positive voltage of the AC voltage source during operation of the first LED by the first driving part to supply voltage to the second LED which is not operated in the positive voltage region of the AC voltage source; a second driving part operating the second LED in a negative voltage region of the AC voltage source; and a second charge part charging with a negative voltage of the AC voltage source during operation of the second LED by the second driving part to supply voltage to the first LED.

The first driving part may include a first driver providing a current path for operation of the first LED in the positive voltage region of the AC voltage source, and a first resistor restricting a current upon operation of the first LED.

The first charge part may include a first rectifier turned on in the positive voltage region of the AC voltage source and a first capacitor charging while the first rectifier is turned on.

The second driving part may include a second driver providing a current path for operation of the second LED in the negative voltage region of the AC voltage source, and a second resistor restricting a current through the second LED during the operation of the second LED.

The second charge part may include a second rectifier turned on in the negative voltage region of the AC voltage source and a second capacitor charging while the second rectifier is turned on.

The first driving part may further include a current control part controlling a current applied to the light emitting part in accordance with temperature variation of the light emitting part.

The second driving part may further include a current control part controlling a current applied to the light emitting part in accordance with temperature variation of the light emitting part.

The current control part may include a thermistor which reduces the current applied to the light emitting part as the light emitting part is increased in temperature.

The first charge part may further include a charge/discharge characteristic determiner connected between the first capacitor and the AC voltage source to determine charge/discharge characteristics of the first charge part.

The second charge part may further include a charge/discharge characteristic determiner connected between the second capacitor and the AC voltage source to determine charge/discharge characteristics of the second charge part.

The charge/discharge characteristic determiner may be a resistor or an inductor.

The voltages to be supplied to the first and second LEDs may be greater than or equal to forward threshold voltages of the first and second LEDs, and may be supplied to anode-terminals of the first and second LEDs, respectively.

In accordance with still another aspect, a method of driving at least two LEDs includes: charging with a voltage to be supplied to one of the at least two LEDs which is not operated while the other of the at least two LEDs is operated by application of an AC voltage source; and discharging the voltage to the one LED before operation of the one LED by application of the AC voltage source.

The charged voltage may be greater than or equal to a forward threshold voltage of the other LED which is not operated, and may be discharged to an anode-terminal of the other LED when discharging the charged voltage.

According to embodiments of the present disclosure, an AC light emitting device, a driving device thereof, and a driving method thereof can solve problems, such as a decrease in power factor, severe total harmonic distortion, excessive flickering, and the like, due to operating characteristics of the AC light emitting device by application of an AC voltage source thereto.

BRIEF DESCRIPTION OF THE DRAWINGS

The above and other aspects, features and advantages of the present invention will be more clearly understood from the following detailed description taken in conjunction with the accompanying drawings, in which.

DETAILED DESCRIPTION OF THE ILLUSTRATED EMBODIMENTS

Hereinafter, exemplary embodiments of the present invention will be described in detail with reference to the accompanying drawings. The following detailed description and drawings are given by way of illustration to provide a thorough understanding of the invention to those skilled in the art, and should not be construed as limiting the scope of the present disclosure.

Figure 3:
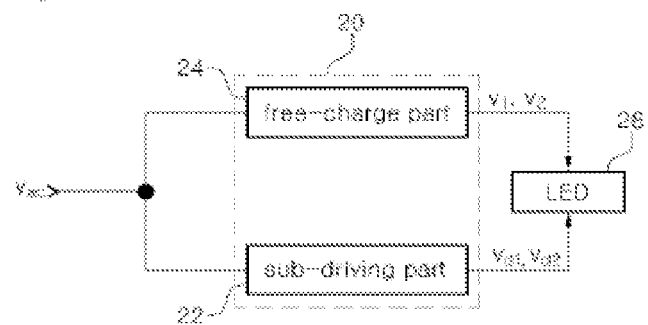
FIG. 3 is a block diagram of a light emitting diode driving device in accordance with an embodiment of the present invention.

FIG. 3 is a block diagram of a light emitting diode (LED) driving device in accordance with an embodiment of the present invention. Referring to FIG. 3, the LED driving device 20 according to this embodiment includes a sub-driving part 22 for driving LEDs 26 upon application of an AC voltage source $V_{ac}$ thereto, and a free-charge part 24. Reference numeral 26 indicates light emitting diodes which include at least two LED cells (or light emitting diodes) shown by a single block for convenience. Herein, the LED cells or the LEDs have substantially the same meaning and will hereinafter be generally referred to as "LEDs" for descriptive convenience.

The sub-driving part 22 is turned on corresponding to each of a positive voltage region (or positive half-period) and a negative voltage region (or negative half-period) of the AC voltage source $V_{ac}$ to provide current paths for driving the LEDs 26. The free-charge part 24 charges with voltages to be supplied to some LEDs, which are not operated while the others of the LEDs 26 (for example, one LED in the case of two LEDs) are operated by the sub-driving part 22. In other words, driving signals $v_{d1}$, $v_{d2}$ are applied to the LEDs 26 through the sub-driving part 22.

The voltages $v_1$, $v_2$ of the free-charge part 24 to be supplied to one of the LEDs, which is not operated, may be greater than or equal to the forward threshold voltages of the one LED and may be provided to anode-terminals of the one LED, respectively.

For example, when the LEDs comprise two LEDs, one of the LEDs is operated in the positive voltage region and the other LED is operated in the negative voltage region. Here, in the positive voltage region, the LED will be operated by the voltage $v_1$ and the driving signal $v_{d1}$, whereas in the negative voltage region, the other LED will be operated by the voltage $v_2$ and the driving signal $v_{d2}$.

As a result, an operating region of the LEDs by the AC voltage source $V_{ac}$ can be increased, thereby reducing the flickering phenomenon and total harmonic distortion while improving the power factor and optical efficiency.

In the above description, "operation of the LED" means that the LED is operated by application of a voltage greater than or equal to the forward threshold voltage of the LED, and will be the same in the following description.

Figure 4:
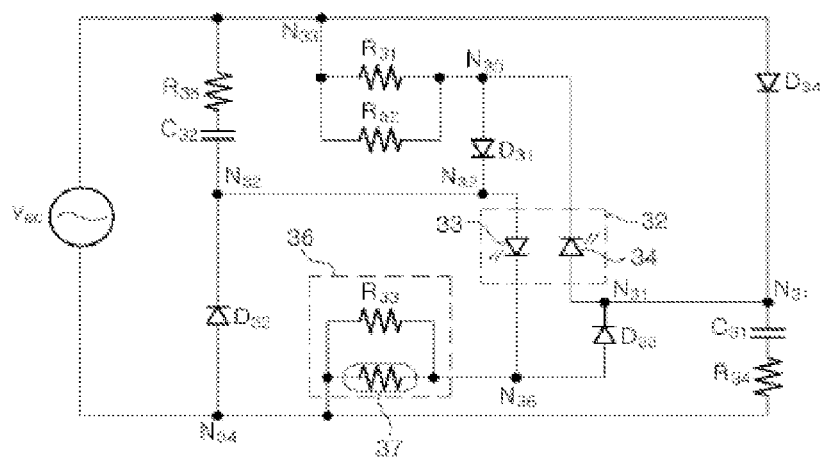
FIGS. 4 to 9 are circuit diagrams and graphs explaining an AC LED in accordance with an embodiment of the present invention.

FIG. 4 is an equivalent circuit diagram for explaining an LED driving device connected to LEDs 32 in accordance with an embodiment of the present invention.

Referring to FIG. 4, the LEDs 32 include LEDs 33, 34 and are operated by an AC voltage source $V_{ac}$. A resistor $R_{35}$ and a capacitor $C_{32}$ are connected to each other in series between one end of the AC voltage source $V_{ac}$ (node $N_{33}$) and an anode-terminal of the LED 33 (node $N_{32}$). A diode $D_{32}$ is connected between the anode-terminal $N_{32}$ of the LED 33 and the other end of the AC voltage source $V_{ac}$ (node $N_{34}$) in a forward direction from the node $N_{34}$ to the node $N_{32}$. A thermistor 37 and a resistor $R_{33}$ are connected to each other in parallel between the node $N_{34}$ and the LED 33, and a resistor $R_{34}$ and a capacitor $C_{31}$ are connected to each other in series between the node $N_{34}$ and an anode-terminal of the LED 34 (node $N_{31}$). Resistors $R_{31}$, $R_{32}$ are connected in parallel to each other between the node $N_{33}$ and a cathode-terminal of the LED 34 (node $N_{35}$). Further, a diode $D_{31}$ is connected between the node $N_{35}$ and the node $N_{32}$ in a forward direction from the node $N_{35}$ to the node $N_{32}$, a diode $D_{33}$ is connected between a cathode-terminal of the LED 33 (node $N_{36}$) and the anode-terminal of the LED 34 (node $N_{31}$) in a forward direction from the node $N_{36}$ to the node $N_{31}$, and a diode $D_{34}$ is connected between the node $N_{33}$ and the node $N_{31}$ in a forward direction from the node $N_{33}$ to the node $N_{31}$.

Referring to FIGS. 3 and 4, the resistors $R_{31}$, $R_{32}$ and the diode $D_{31}$, and the resistor $R_{33}$ and the diode $D_{33}$ constitute the sub-driving part 22. Specifically, the resistors $R_{31}$, $R_{32}$ and the diode $D_{31}$ constituting a first sub-driving part provide a current path for driving the LED 33 in the positive voltage region of the AC voltage source $V_{ac}$($v_{d1}$ in FIG. 3). Further, the resistors $R_{33}$ and the diode $D_{33}$ constituting a second sub-driving part provide a current path for driving the LED 34 in the negative voltage region of the AC voltage source $V_{ac}$ ($v_{d2}$ in FIG. 3).

Herein, the number of resistors $R_{31}$, $R_{32}$ for determining a current through the LED 32 during operation of the LED 32 and the number of resistor $R_{33}$ are respectively illustrated as two resistors and a single resistor for descriptive convenience. However, it should be understood that the number and magnitude of the resistors or connection therebetween may be differently designed as needed in consideration of the number and rated power of the LED 32. Further, the AC voltage source $V_{ac}$ will be described assuming that a direction from the node $N_{33}$ to the node $N_{34}$ is a negative voltage direction and a direction from the node $N_{34}$ to the node $N_{33}$ is a positive voltage direction.

For example, in the positive voltage region of the AC voltage source $V_{ac}$, particularly, by a positive voltage of the AC voltage source $V_{ac}$ greater than or equal to the forward threshold voltage of the LED 33, a current path of the AC voltage source $V_{ac}$, node $N_{33}$, resistors $R_{31}$, $R_{32}$, node $N_{35}$, diode $D_{31}$, node $N_{32}$, LED 33, node $N_{36}$, resistor $R_{33}$ (or current control part 37), and node $N_{34}$ is formed. Further, in the negative voltage region of the AC voltage source $V_{ac}$, particularly, by a negative voltage of the AC voltage source $V_{ac}$ greater than or equal to the threshold voltage of the LED 34, a current path of the AC voltage source $V_{ac}$, node $N_{34}$, resistor $R_{33}$ (or current control part 37), diode $D_{33}$, LED 34, node $N_{35}$, resistors $R_{31}$, $R_{32}$, and node $N_{33}$ is formed.

Next, the free-charge part 24 includes a rectifier $D_{34}$, the capacitor $C_{31}$ and the resistor $R_{34}$, and a rectifier $D_{32}$, the capacitor $C_{32}$ and the resistor $R_{35}$. Then, the free-charge part 24 charges with voltage to be supplied to the LED 34 or 33 which is not operated while the other LED 33 or 34 is operated by the sub-driving part 22.

That is, the free-charge part 24 includes a first charge part $D_{34}$, $C_{31}$ which charges during application of the positive voltage of the AC voltage source $V_{ac}$ thereto, and a second charge part $D_{32}$, $C_{32}$ which charges during application of the negative voltage of the AC voltage source $V_{ac}$ thereto. To control charge/discharge characteristics, resistor $R_{34}$ may be further connected between the capacitor $C_{31}$ of the first charge part $D_{34}$, $C_{31}$ and the AC voltage source $V_{ac}$ and resistor $R_{35}$ may be further connected between the capacitor $C_{32}$ of the second charge part $D_{32}$, $C_{32}$ and the AC voltage source $V_{ac}$, respectively. As elements to control the charge/discharge characteristics, inductors (see $L_{51}$ and $L_{52}$ of FIG. 11) may be used in addition to the resistors $R_{34}$ and $R_{35}$.

The first charge part $D_{34}$, $C_{31}$ includes the first rectifier $D_{34}$ which is turned on in the positive voltage region of the AC voltage source $V_{ac}$, and the first capacitor $C_{31}$ which charges while the first rectifier $D_{34}$ is turned on. The second charge part $D_{32}$, $C_{32}$ includes the second rectifier $D_{32}$ which is turned on in the negative voltage region of the AC voltage source $V_{ac}$, and the second capacitor $C_{32}$ which charges while the second rectifier $D_{32}$ is turned on.

For example, when the diode $D_{31}$ of the sub-driving part 22 is turned on to operate the LED 33 in the positive voltage region of the AC voltage source $V_{ac}$, the diode $D_{34}$ connected in the forward direction with respect to the positive voltage region of the AC voltage source $V_{ac}$ is turned on to allow the capacitor $C_{31}$ to be charged. Then, the charged voltage ($v_2$ of FIG. 3) of the capacitor $C_{31}$ is supplied to the anode-terminal of the LED 34 (node $N_{31}$).

Further, when the diode $D_{33}$ of the sub-driving part 22 is turned on to operate the LED 34 in the negative voltage region of the AC voltage source $V_{ac}$, the diode $D_{32}$ connected in the forward direction with respect to the negative voltage region of the AC voltage source $V_{ac}$ is turned on to allow the capacitor $C_{32}$ to be charged. Then, the charged voltage ($v_1$ of FIG. 3) of the capacitor $C_{32}$ is supplied to the anode-terminal of the LED 33 (node $N_{32}$).

As a result, the free-charge part 24 charges, in the positive voltage region of the AC voltage source $V_{ac}$ applied to the LED 32, with voltage for operating the LED 32 before is operation of the LED 32 by application of a negative voltage after the positive voltage region of the AC voltage source $V_{ac}$, and charges, in the negative voltage region of the AC voltage source $V_{ac}$, with voltage for operating the LED 32 before operation of the LED 32 by application of a positive voltage of the AC voltage source $V_{ac}$.

Accordingly, the voltages of the first and second capacitors $C_{31}$ and $C_{32}$ may be greater than or equal to the forward threshold voltages of the LEDs 34 and 33, respectively. In other words, the voltage of the first capacitor $C_{31}$ may be greater than or equal to the forward threshold voltage of the LED 34, and the voltage of the second capacitor $C_{32}$ may be greater than or equal to the forward threshold voltage of the LED 33.

For example, since the voltages of the first and second capacitors $C_{31}$ and $C_{32}$ are obtained by converting AC voltage into DC voltage, an AC voltage source of $220V_{rms}$ (root mean square value) allows the capacitors to be charged with a voltage of about $310V_{dc}$ (that is, $220V_{rms} \times 1.414 = 310V_{dc}$).

Additionally, the current control part 36 may be provided between the AC voltage source $V_{ac}$ and the LED 32 to control a current applied to the LED 32 depending on temperature variation of the LED 32.

For example, as shown in FIG. 4, the current control part 36 may be realized by a circuit that includes the thermistor 37 and the resistor $R_{33}$. That is, a positive temperature coefficient (PTC) circuit capable of reducing the current applied to the LED 32 may be used to prevent the temperature of the LED 32 from increasing due to continuous operation of the LED 32. However, the invention is not limited thereto and may use any circuit capable of controlling the current in consideration of the temperature variation of the LED 32.

Figure 5:
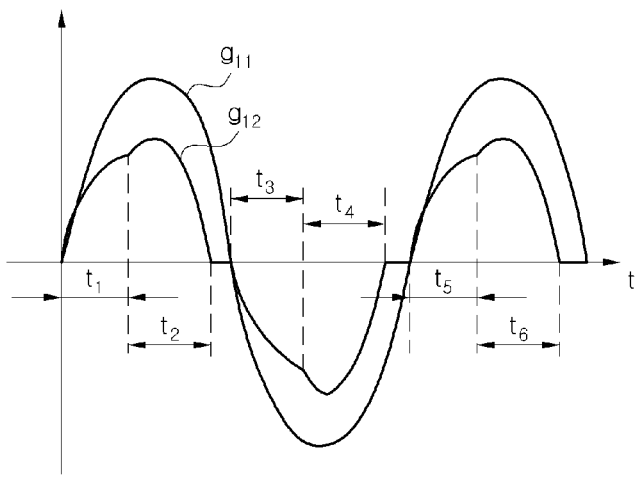

FIG. 5 is a graph depicting operation characteristics of the LED 32 by the LED driving device shown in FIG. 4 during application of the AC voltage source $V_{ac}$. Referring to FIG. 5, $g_{11}$ is a voltage curve of the AC voltage source $V_{ac}$ and $g_{12}$ is a current curve across the LED 32. The x-axis indicates time and the y-axis indicates voltage or current.

As described in FIG. 3, the free-charge part 24 charges, in a positive voltage region ($t_1+t_2$ region of $g_{11}$) of the AC voltage source $V_{ac}$ applied to the LED 32, with voltage for operating the LED 32 before operation of the LED 32 by application of a negative voltage (voltage in a $t_3+t_4$ region of $g_{11}$) after the positive voltage region of the AC voltage source $V_{ac}$, and charges, in a negative voltage region ($t_3+t_4$ region of $g_{11}$) of the AC voltage source $V_{ac}$, with voltage for operating the LED 32 before operation of the LED 32 by application of a positive voltage (voltage in a $t_5+t_6$ region of $g_{11}$) of the AC voltage source $V_{ac}$.

Here, since the voltage-current characteristics of the AC voltage source $V_{ac}$ in regions $t_1+t_2$ and $t_5+t_6$ are the same except for voltage and current after a single period and continuously repeated, only the voltage-current characteristics (in regions $t_1+t_2$ and $t_3+t_4$) of the AC voltage source $V_{ac}$ in a single period will hereinafter be described.

In the current curve $g_{12}$, region $t_1$ indicates a region where the LED 33 is operated by a current resulting from discharge of the second capacitor $C_{32}$ before operation of the LED 33 by a positive voltage of the AC voltage source $V_{ac}$, and region $t_2$ indicates a region where the LED 33 is operated by the positive voltage of the AC voltage source $V_{ac}$.

Region $t_3$ indicates a region where the LED 34 is operated by a current resulting from discharge of the first capacitor $C_{31}$ before operation of the LED 34 by a negative voltage of the AC voltage source $V_{ac}$, and region $t_4$ indicates a region where the LED 34 is operated by the negative voltage of the AC voltage source $V_{ac}$.

As described above, each of the first and second capacitors $C_{31}$ and $C_{32}$ charges in a half-period of the AC voltage source $V_{ac}$ before operation of the LED 32. That is, the first capacitor $C_{31}$ charges in the positive voltage region of the AC voltage source and the second capacitor $C_{32}$ charges in the negative voltage region of the AC voltage source $V_{ac}$.

In the above description, since it is apparent to a person having ordinary knowledge in the art that inverse connection of the diodes $D_{31}$, $D_{32}$, $D_{33}$ and $D_{34}$ is interpreted as an open circuit at a voltage less than or equal to the forward threshold voltage of the diodes, a detailed description thereof is omitted.

As such, in this embodiment, the device for driving at least two LEDs by application of the AC voltage source includes the sub-driving part 22 which is turned on corresponding to each of the positive and negative voltage regions of the AC voltage source to provide the current path for driving the LEDs, and the free-charge part charging with voltage to be supplied to one of the LEDs which is not operated while the other LED is operated by the sub-driving part 22. With such a driving device, an avalanche current flow across the LED due to the characteristics of the LED is suppressed from occurring at the forward threshold voltage or more to thereby reduce the total harmonic distortion, and the operation region of the LED 32 is increased to reduce the flickering phenomenon while improving the power factor and optical efficiency.

Next, an AC light emitting device according to one embodiment of the present invention will be described with reference to FIGS. 4 to 9.

The AC light emitting device according to this embodiment of the present invention includes a light emitting part 32, which includes at least two LEDs (for example, 33 and 34) operated by an AC voltage source $V_{ac}$, and a driving part (part excluding the light emitting part 32 and the AC voltage source $V_{ac}$ in FIG. 3a), which drives the LEDs by application of the AC voltage source to the driving part and charges with voltage to be supplied to one of the LEDs which is not operated while the other LED is operated. For example, the voltage is supplied to the LED 34 when the LED 33 is operated, or is supplied to the LED 33 when the LED 34 is operated.

The voltage, that is, the voltage to be supplied to one of the LEDs which is not operated while the other LED is operated, may be greater than or equal to the forward threshold voltage of the one LED and may be provided to an anode-terminal of the one LED.

The driving part includes a sub-driving part $R_{31}$, $R_{32}$, $D_{31}$, $R_{33}$, 37, $D_{33}$ which is turned on corresponding to each of the positive and negative voltage regions of the AC voltage source $V_{ac}$ to provide current paths for the LEDs 33, 34; and a free-charge part $D_{34}$, $C_{31}$, $R_{34}$, $D_{32}$, $C_{32}$, $R_{35}$ that charges, in the positive voltage region of the AC voltage source $V_{ac}$, with a voltage greater than or equal to the forward threshold voltage of the first LED 34, which is not operated in the positive voltage region, to supply the voltage to the first LED 34, and that charges, in the negative voltage region of the AC voltage source $V_{ac}$, with a voltage greater than or equal to the forward threshold voltage of the second LED 33, which is not operated in the negative voltage region, to supply the voltage to the second LED 33 before operation of the second LED 33 by application of a positive voltage after the negative voltage region.

The free-charge part $D_{34}$, $C_{31}$, $R_{34}$, $D_{32}$, $C_{32}$, $R_{35}$ includes a first charge part $D_{34}$, $C_{31}$, $R_{34}$ that charges in the positive voltage region of the AC voltage source $V_{ac}$ to supply the voltage, which is greater than or equal to the forward threshold voltage of the first LED 34, to the first LED 34 before operation of the first LED 34 by application of the negative voltage, and a second charge part $D_{32}$, $C_{32}$, $R_{35}$ that charges in the negative voltage region of the AC voltage source $V_{ac}$ to supply the voltage, which is greater than or equal to the forward threshold voltage of the second LED 33, to the second LED 33 before operation of the second LED 33 by application of the positive voltage.

Figure 11:
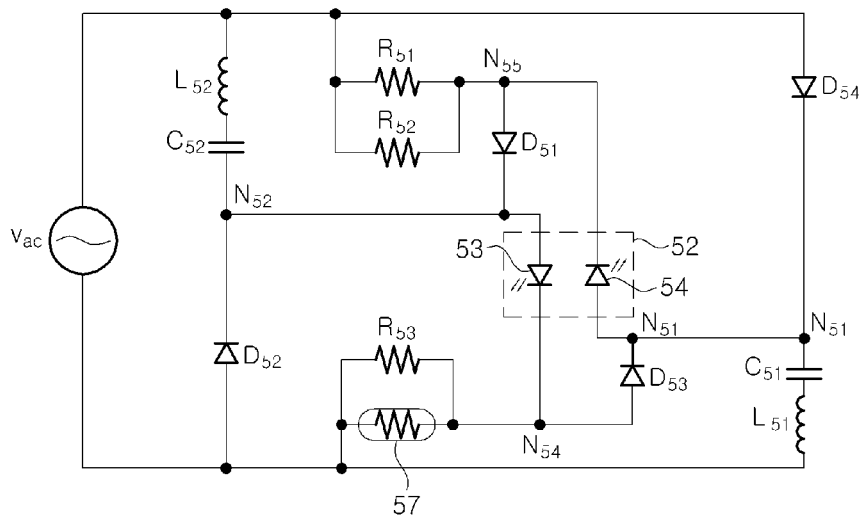
FIGS. 11 and 12 are circuit diagram of modifications of the AC light emitting device shown in FIG. 4.
Figure 12:
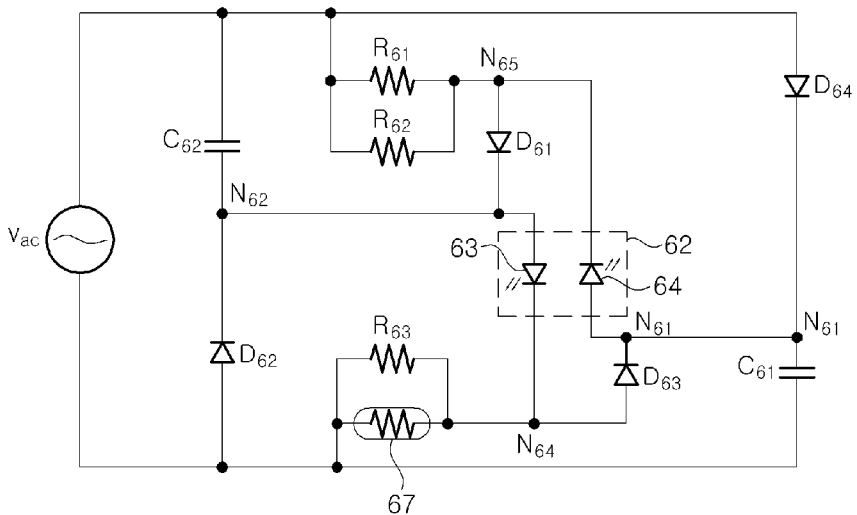

The first charge part $D_{34}$, $C_{31}$, $R_{34}$ includes the first rectifier $D_{34}$ which is turned on in the positive voltage region of the AC voltage source $V_{ac}$, and the first capacitor $C_{31}$ which charges while the first rectifier $D_{34}$ is turned on. The first charge part may further include a charge/discharge characteristic determiner (hereinafter, referred to as a "first charge/discharge characteristic determiner" for distinction from the charge/discharge characteristic determiner $R_{35}$ described below) to control a charging/discharging time by the first capacitor $C_{31}$. In FIG. 4, the first charge/discharge characteristic determiner is illustrated as the resistor $R_{34}$, but it may be provided as other elements, some of which are illustrated in FIGS. 11 and 12.

The second charge part $D_{32}$, $C_{32}$, $R_{35}$ includes the second rectifier $D_{32}$ which is turned on in the negative voltage region of the AC voltage source $V_{ac}$, and the second capacitor $C_{32}$ which charges while the second rectifier $D_{32}$ is turned on. The second charge part may further include a charge/discharge characteristic determiner (hereinafter, referred to as a "second charge/discharge characteristic determiner" for distinction from the first charge/discharge characteristic determiner described above) to control a charging/discharging time by the second capacitor $C_{32}$. As in the first charge/discharge characteristic determiner, the second charge/discharge characteristic determiner is illustrated as the resistor $R_{35}$ in FIG. 4, but it may be provided as other elements, some of which are illustrated in FIGS. 11 and 12.

The AC light emitting device may further include a current control part 36 connected between the AC voltage source $V_{ac}$ and the light emitting part 32 to control a current applied to the light emitting part 32 depending on temperature variation of the light emitting part 32. The current control part 36 may include a thermistor 37 which decreases the current applied to the light emitting part 32 as the temperature of the light emitting part 32 increases. However, the current control part 36 is not limited thereto, but may include any circuit as long as it can control the current of the overall circuit corresponding to the temperature variation of the light emitting part 32.

Since, for a description of the driving part of the AC light emitting device reference can be made to the description of the above embodiment relating to the LED driving device, operation of the AC voltage source of the AC light emitting device including the driving part in each half-period will be described.

Figure 6:
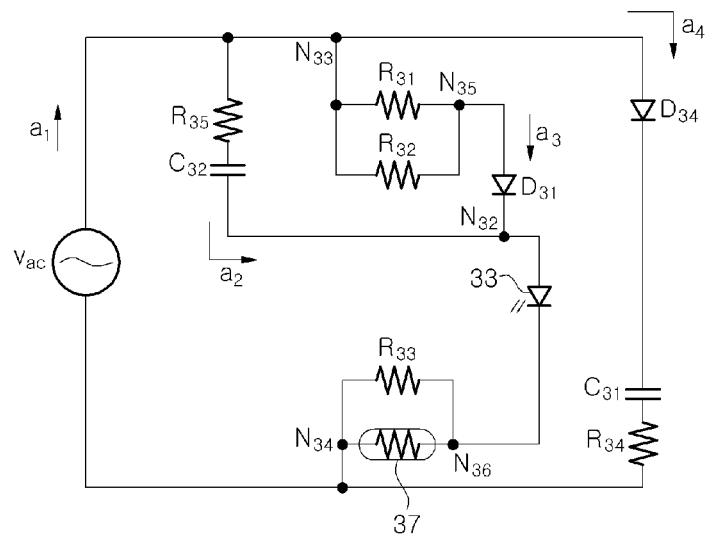
Figure 7:
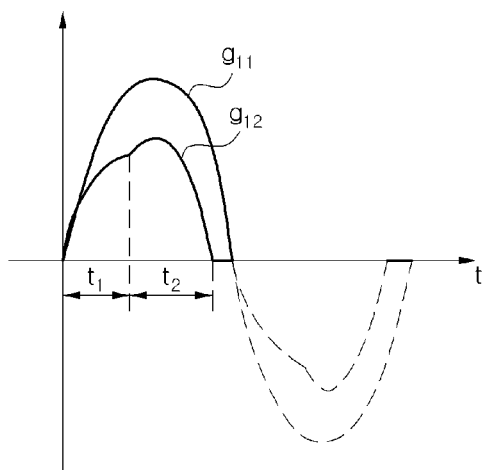

FIGS. 6 and 7 are a circuit diagram explaining current directions $a_1$, $a_2$, $a_3$, $a_4$ in the overall circuit in a positive voltage region of the AC voltage source $V_{ac}$, and a graph depicting characteristics of a current across the LED 33 for the AC voltage source $V_{ac}$, respectively.

Referring to FIG. 6, $a_1$ indicates a direction of a current provided by the AC voltage source $V_{ac}$ in the positive half-period of the AC voltage source $V_{ac}$, $a_2$ indicates a direction of a current provided by a voltage of the second capacitor $C_{32}$ charged in the negative half-period prior to the positive half-period of the AC voltage source $V_{ac}$, $a_3$ indicates a direction of a current provided by the AC voltage source $V_{ac}$ and supplied to the LED 33, and $a_4$ indicates a current path of charging the first capacitor $C_{31}$ in the positive half-period of the AC voltage source $V_{ac}$.

Referring to FIGS. 6 and 7, in the positive half-period $g_{11}$ of the AC voltage source $V_{ac}$, the voltage of the second capacitor $C_{32}$ is applied to the anode terminal of the LED 33 (node $N_{32}$) to operate the LED 33 before operation of the LED 33 by application of a positive voltage of the AC voltage source $V_{ac}$, that is, before operation of the LED 33 by $a_3$ (see curve $g_{12}$ in region $t_1$). Here, the discharging characteristics of the second capacitor $C_{32}$ are determined by the resistor $R_{35}$ and, more specifically, in proportion to the product of the resistance of the resistor $R_{35}$ and the capacitance of the second capacitor $C_{32}$.

Further, if the positive voltage of the AC voltage source $V_{ac}$ is a predetermined value or more, the current $a_3$ by the AC voltage source $V_{ac}$ allows the LED 33 to operate (see curve $g_{12}$ in region $t_2$), and if the positive voltage of the AC voltage source $V_{ac}$ becomes the forward threshold voltage or less of the LED 33, the LED 33 does not operate (after region $t_2$).

On the other hand, in addition to such operation of the LED 33, the first charge part $D_{34}$, $C_{31}$, $R_{34}$ performs charging with voltage to be used in the next negative half-period of the AC voltage source $V_{ac}$. In other words, if the voltage is greater than or equal to the forward threshold voltage of the rectifier $D_{34}$, the rectifier $D_{34}$ is turned on to allow the first capacitor $C_{31}$ to be charged. The charging characteristics of the first charge part $D_{34}$, $C_{31}$, $R_{34}$ are determined by the resistor $R_{34}$ and, more specifically, in proportion to the product of the resistance of the resistor $R_{34}$ and the capacitance of the first capacitor $C_{31}$.

Thus, from the curve $g_{12}$ in the region $t_1$ exhibiting the current characteristics of the LED 33, it can be seen that operation of the LED 33 starts at a much earlier time point than in the case where there is no current path $a_2$ by the second capacitor $C_{32}$, that is, the second charge part $C_{32}$, $R_{35}$ (corresponding to a section indicated by a dotted line in the curve $g_{12}$ of the region $t_1$).

As such, since the operation of the LED 33 starts at an earlier time point and the operation region of the LED 33 becomes widened, it is possible to solve the problems of flickering and total harmonic distortion (THD) while improving the power factor (PF) that is expressed by the relationship, PF=P/S, between apparent power S and effective power P.

Figure 8:
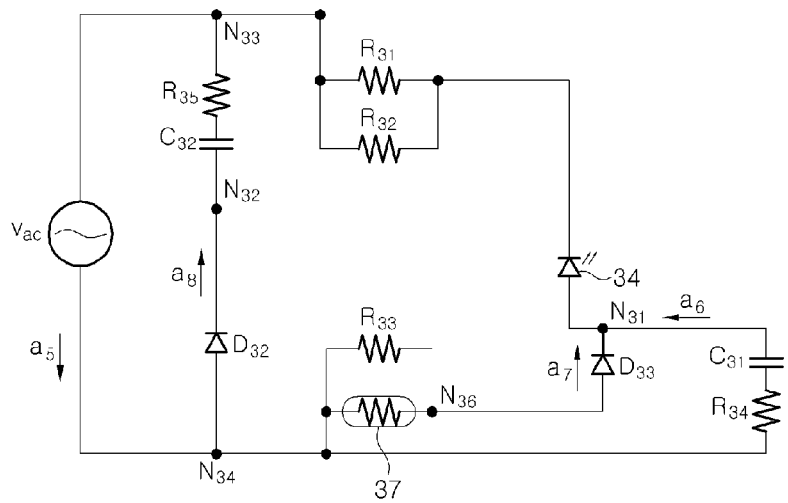
Figure 9:
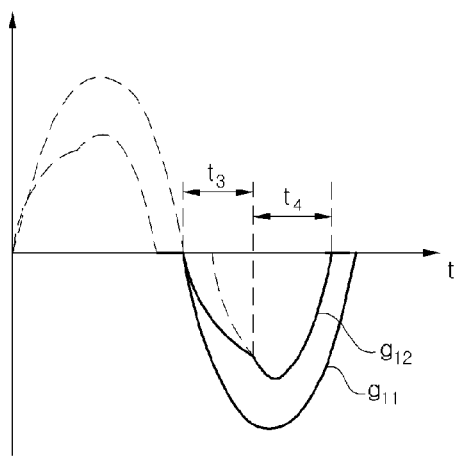

Next, FIGS. 8 and 9 are a circuit diagram explaining a current direction $a_5$, $a_6$, $a_7$, $a_8$ in the overall circuit in a negative voltage region of the AC voltage source $V_{ac}$, and a graph depicting characteristics of a current across the LED 34 for the AC voltage source $V_{ac}$, respectively.

Referring to FIG. 8, $a_5$ indicates a direction of a current provided by the AC voltage source $V_{ac}$ in the negative half-period of the AC voltage source $V_{ac}$, $a_6$ indicates a direction of a current provided by a voltage of the first capacitor $C_{31}$ charged in the positive half-period (that is, in the region of FIG. 6) prior to the negative half-period of the AC voltage source $V_{ac}$, $a_7$ indicates a direction of a current provided by the AC voltage source $V_{ac}$ and supplied to the LED 34, and $a_8$ indicates a current path of charging the second capacitor $C_{32}$ in the negative half-period of the AC voltage source $V_{ac}$.

Referring to FIGS. 8 and 9, in the negative half-period $g_{11}$ of the AC voltage source $V_{ac}$, the voltage of the first capacitor $C_{31}$ is applied to the anode terminal of the LED 34 (node $N_{31}$) to operate the LED 34 before operation of the LED 34 by application of a negative voltage of the AC voltage source $V_{ac}$, that is, before operation of the LED 34 by $a_7$ (see curve $g_{12}$ in region $t_3$). Here, the discharging characteristics of the first capacitor $C_{31}$ are determined by the resistor $R_{34}$ and, more specifically, in proportion to the product of the resistance of the resistor $R_{34}$ and the capacitance of the first capacitor $C_{31}$.

Further, if the negative voltage of the AC voltage source Vac is a predetermined value or more, the current $a_7$ by the AC voltage source $V_{ac}$ allows the LED 34 to operate (see curve $g_{12}$ in region $t_4$), and if the negative voltage of the AC voltage source $V_{ac}$ becomes the forward threshold voltage or less of the LED 34, the LED 34 does not operate (after region $t_4$).

On the other hand, in addition to such operation of the LED 34, the second charge part $D_{32}$, $C_{32}$, $R_{35}$ performs charging with voltage to be used in the next positive half-period of the AC voltage source $V_{ac}$. In other words, if the voltage is greater than or equal to the forward is threshold voltage of the rectifier $D_{32}$, the rectifier $D_{32}$ is turned on to allow the second capacitor $C_{32}$ to be charged. The charging characteristics of the second charge part $D_{32}$, $C_{32}$, $R_{35}$ are determined by the resistor $R_{35}$ and, more specifically, in proportion to the product of the resistance of the resistor $R_{35}$ and the capacitance of the second capacitor $C_{32}$.

Thus, from the curve $g_{12}$ in the region $t_3$ exhibiting the current characteristics of the LED 34, it can be seen that operation of the LED 34 starts at a much earlier time point than in the case where there is no current path $a_6$ by the first capacitor $C_{31}$, that is, the first charge part $C_{31}$, $R_{34}$ (corresponding to a section indicated by a dotted line in the curve $g_{12}$ of the region $t_3$).

As such, since the operation of the LED 34 starts at an earlier time point and the operation region of the LED 34 becomes widened, it is possible to solve the problems of flickering and total harmonic distortion (THD) while improving the power factor (PF).

As shown in FIG. 5, which is the graph depicting the operation characteristics of the LED 32 according to FIGS. 6 and 8, the AC light emitting device according to this embodiment of the present invention increases the operation region of the LED to exhibit a sinusoidal wave as compared to the conventional AC light emitting device, thereby reducing the total harmonic distortion and flicker distortion while improving the power factor.

Figure 10:
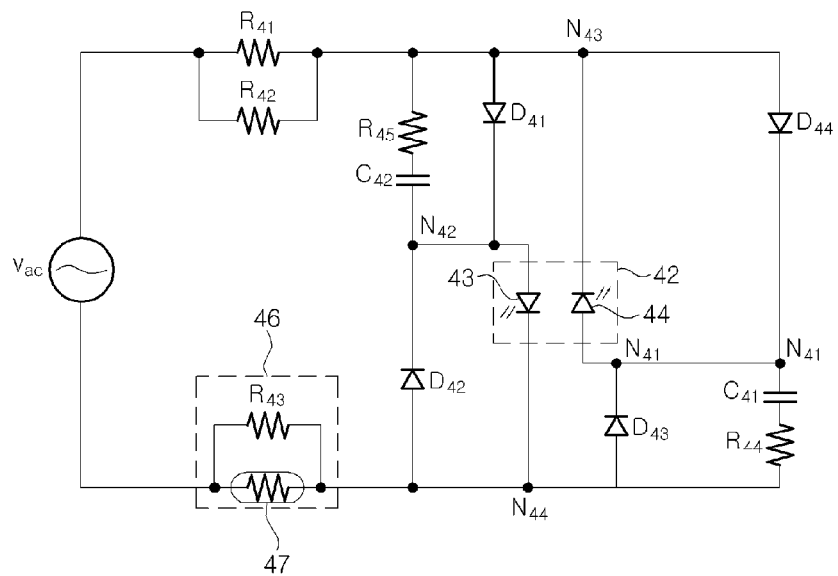
FIG. 10 is an equivalent circuit diagram of an AC light emitting device in accordance with another embodiment of the present invention.

FIG. 10 is an equivalent circuit diagram of an AC light emitting device in accordance with another embodiment of the present invention. Referring to FIG. 4, the AC light emitting device includes: a light emitting part 42 including at least two LEDs 43, 44 (first LED 43 and second LED 44) operated by an AC voltage source $V_{ac}$; a first sub-driving part $R_{41}$, $R_{42}$, $D_{41}$ operating the first LED 43 in a positive voltage region of the AC voltage source $V_{ac}$; a first charge part $D_{44}$, $C_{41}$, $R_{44}$ charged with a positive voltage of the AC voltage source $V_{ac}$ during operation of the first LED 43 by the first sub-driving part $R_{41}$, $R_{42}$, $D_{41}$ to supply voltage to the second LED 44 which is not operated in the positive voltage region of the AC voltage source $V_{ac}$; a second sub-driving part 46, $D_{43}$ operating the second LED 44 in a negative voltage region of the AC voltage source $V_{ac}$; and a second charge part $D_{42}$, $C_{42}$, $R_{45}$ charged with a negative voltage of the AC voltage source $V_{ac}$ during operation of the second LED 44 by the sub-driving part 46, $D_{43}$ to supply voltage to the first LED 43.

The first sub-driving part $R_{41}$, $R_{42}$, $D_{41}$, the first charge part $D_{44}$, $C_{41}$, $R_{44}$, the second sub-driving part 46, $D_{43}$, and the second charge part $D_{42}$, $C_{42}$, $R_{45}$ are not independently operated, but are influenced by one another in driving and charging. Although not described in detail, this is also applied to the embodiment shown in FIG. 4.

For example, when the first capacitor $C_{41}$ of the first charge part is charged, the charging characteristics, for example, a time constant, of the first sub-driving part $R_{41}$, $R_{42}$, $D_{41}$ and the second sub-driving part 46, $D_{43}$ are determined, and this is the same in the case where the second capacitor $C_{42}$ of the second charge part is charged. Accordingly, it should be noted that such distinction of components is provided for convenience of description.

Next, the respective components will be described in more detail.

The first sub-driving part $R_{41}$, $R_{42}$, $D_{41}$ includes a first driver $D_{41}$ which provides a current path for operation of the first LED 43 in a positive voltage region of the AC voltage source $V_{ac}$, and resistors $R_{41}$, $R_{42}$ (hereinafter, referred to as a "first resistor") which restrict a current during operation of the first LED 43. In this embodiment, the resistors $R_{41}$, $R_{42}$ are shown as being connected in parallel to each other, but may be appropriately designed as needed in consideration of the number of LEDs in the light emitting part 42, rated capacity, and the like.

The first driver $D_{41}$ may be a diode connected between the first resistor $R_{41}$, $R_{42}$ and the LED 43 in a forward direction from the first resistor $R_{41}$, $R_{42}$ toward the LED 43.

The first charge part $D_{44}$, $C_{41}$, $R_{44}$ includes a first rectifier $D_{44}$ which is turned on in the positive voltage region of the AC voltage source $V_{ac}$, and a first capacitor $C_{41}$ which charges while the first rectifier $D_{44}$ is turned on. Further, the first charge part $D_{44}$, $C_{41}$, $R_{44}$ may further include a first charge/discharge characteristic determiner $R_{44}$ connected between the first capacitor $C_{41}$ and the AC voltage source $V_{ac}$ to control the charge/discharge characteristics of the first charge part $D_{44}$, $C_{41}$, $R_{44}$. For example, the first charge/discharge characteristic determiner $R_{44}$ may be a resistor $R_{44}$ as shown in FIG. 4.

The second sub-driving part 46, $D_{43}$ includes a second driver $D_{43}$ which provides a current path for operation of the second LED 44 in a negative voltage region of the AC voltage source $V_{ac}$, and a second resistor $R_{43}$ which restricts a current during operation of the second LED 44.

The second sub-driving part 46, $D_{43}$ may further include a current control part 47 which controls a current applied to the light emitting part 42 in accordance with temperature variation of the light emitting part 42. For example, the current control part 47 may be realized by a thermistor 47 connected to the second resistor $R_{43}$ to reduce the current applied to the light emitting part 42 when the temperature of the light emitting part 42 increases during operation. One example of the thermistor 47 may be a positive temperature coefficient (PTC) thermistor which increases in resistance as the temperature increases.

For example, in a normal temperature range of the light emitting part 42, the resistance of the second resistor $R_{43}$ is much higher than that of the thermistor 47, so that most of the driving current of the light emitting part 42 initially flows through the thermistor 47. Then, as the temperature of the light emitting part 42 gradually increases, the thermistor 47 also gradually increases in resistance and operates to allow more current to flow towards the second resistor $R_{43}$, thereby controlling the temperature of the light emitting part 42 in a proper range. However, the circuit of the thermistor 47 and the second resistor $R_{43}$ is not limited to that shown in FIG. 4, and may use any circuit capable of reducing the current across the circuit as the temperature increases.

Furthermore, the current control part 47 is shown as being connected to the second sub-driving part 46, $D_{43}$ in FIG. 10, but may be connected to the first sub-driving part $R_{41}$, $R_{42}$, $D_{41}$. For example, the thermistor 47 may be connected in parallel to the first resistor $R_{41}$, $R_{42}$.

The second charge part $D_{42}$, $C_{42}$, $R_{45}$ includes a second rectifier $D_{42}$ which is turned on in the negative voltage region of the AC voltage source $V_{ac}$, and a second capacitor $C_{42}$ which charges while the second rectifier $D_{42}$ is turned on. The second charge part $D_{42}$, $C_{42}$, $R_{45}$ may further include a second charge/discharge characteristic determiner $R_{45}$ connected between the second capacitor $C_{42}$ and the AC voltage source $V_{ac}$ to control the charge/discharge characteristics of the second charge part $D_{42}$, $C_{42}$, $R_{45}$. For example, as shown in FIG. 4, second charge/discharge characteristic determiner $R_{45}$ may be a resistor $R_{45}$.

As in the embodiment described with reference to FIGS. 4 to 9, the voltages to be supplied to the first and second LEDs 43 and 44 may be greater than or equal to the forward threshold voltages of the first and second LEDs 43 and 44, respectively.

Driving of the first and second drivers, charging of the first and second charge parts, and operation of the light emitting part are substantially the same as those described with reference to FIGS. 6 to 9, and repetitious descriptions thereof will be omitted herein.

FIGS. 11 and 12 are circuit diagrams of modifications of the AC light emitting device shown in FIG. 4. Particularly, in FIG. 11, an AC light emitting device according to a modification includes inductors $L_{51}$, $L_{52}$ as the charge/discharge characteristic determiners instead of the resistors $R_{34}$, $R_{35}$. In this case, it is advantageous in that the AC light emitting device of this modification can reduce power loss caused by the resistors $R_{34}$, $R_{35}$ as compared with the embodiment shown in FIG. 4. FIG. 12 is an equivalent circuit diagram where any of the inductors $L_{51}$, $L_{52}$ and the resistors $R_{34}$, $R_{35}$ is not used in the AC light emitting device, thereby reducing power loss by the resistors $R_{34}$, $R_{35}$ and noise caused by resonance between the inductors $L_{51}$, $L_{52}$ and the capacitors $C_{51}$, $C_{52}$.

Next, a method of driving at least two LEDs according to one embodiment of the present invention will be described with reference to FIGS. 4 to 9.

The driving method according to this embodiment includes charging with a voltage to be supplied to one of the LEDs 33, 34 (for example, the LED 34) which is not operated while the other LED (for example, the LED 33) is operated by application of an AC voltage source $V_{ac}$, and discharging the voltage to the one LED 34 before operation of the one LED 34 by application of the AC voltage source $V_{ac}$.

In the charging operation, the voltage is greater than or equal to the forward threshold voltage of the one LED 34 which is not operated, and in the discharging operation, the voltage is discharged to an anode terminal of the one LED 34 (node $N_{31}$) which is not operated.

Conversely, in the case where LED 33 is not operated while the LED 34 is operated by application of the AC voltage source $V_{ac}$, the method includes charging with a voltage to be supplied to the LED 33, and discharging the voltage to the LED 33 before operation of the LED 33 by application of the AC voltage source $V_{ac}$.

Before operation of the LED 33 or 34 by application of a positive or negative voltage of the AC voltage source $V_{ac}$, that is, when the positive or negative voltage of the AC voltage source $V_{ac}$ is less than the forward threshold voltage of the LEDs 33 or 34 connected in the forward direction, the LEDs 33 or 34 is driven by a voltage provided in a precedent half-period of the AC voltage source $V_{ac}$, as described with reference to FIGS. 6 to 9. Thus, a detailed description of this operation will be omitted herein.

In the above description of the embodiments, the number of light emitting parts or LEDs is illustrated as two elements for convenience of description, and the invention is not limited thereto.

As described above, the AC light emitting device and the driving device thereof according to the embodiments allow the capacitors to be charged with energy for a half-period of an AC voltage source and increase operation regions of LEDs using the energy, thereby reducing the total harmonic distortion and flickering phenomenon while improving the power factor and operation efficiency of the LEDs.

Figure 1:
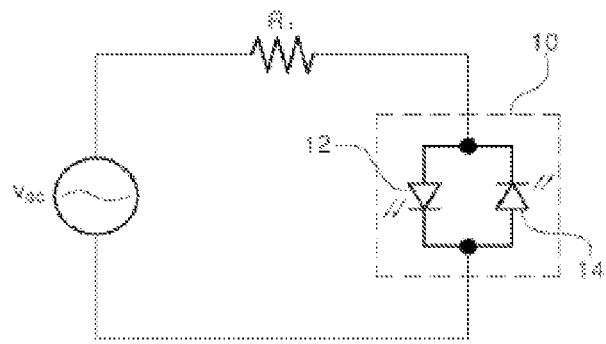
FIGS. 1 and 2 are a circuit diagram and a graph explaining problems of a conventional AC LED.
Figure 2:
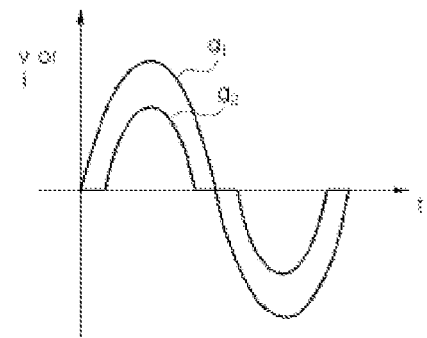

Table 1 shows comparative data of a conventional AC light emitting device (see FIG. 1) and an AC light emitting device according to one embodiment of the present invention (see FIG. 4) in view of reduction in total harmonic distortion (THD), power factor (PF) and flickering.

TABLE 1

|  | 203 V Input | | 220 V Input | |
|---|---|---|---|---|
|  | Conventional (2.7 W) | Present Invention (4.0 W) | Conventional (4.1 W) | Present Invention (5.45 W) |
| PF | 0.87 | 0.89 | 0.89 | 0.91 |
| THD [%] | 47 | 9.2 | 43 | 10 |
| $I_{in\_rms}$ [mA] | 15.4 | 22.2 | 20.5 | 27 |

As can be seen in Table 1, the AC light emitting device according to the present invention is significantly improved as compared to the conventional AC light emitting device in view of the power factor (PF) and total harmonic distortion (THD). In Table 1, the numerical value (%) of the total harmonic distortion (THD) is a percentage with respect to a third-order harmonic component. Iin_rms[mA] is a root mean square of an operation current of an LED. A high root mean square means that an operation region of the LED increases in a single period, and can be interpreted as reduction of the flickering phenomenon.

To describe reduction of the flickering phenomena depending on frequencies of the AC voltage source Vac, results of testing the conventional AC light emitting device (see FIG. 1) and the AC light emitting device according to the present invention (see FIG. 4) are shown in Table 2.

TABLE 2

|  |  | Input frequency (Hz) | | | | |
|---|---|---|---|---|---|---|
|  |  | 40 | 45 | 50 | 55 | 60 |
|  |  | Light output period (ms) | | | | |
|  |  | 12.5 | 11.1 | 10 | 9 | 8.3 |
| Light output time (ms) | Conventional | 7 (5.5) | 6 (5.1) | 5.5 (4.5) | 5 (4) | 4.8 (3.5) |
|  | Present Invention | 10.8 (1.7) | 10 (1.1) | 8.4 (1.6) | 8 (1) | 7.6 (0.7) |
| Output transfer ratio (%) | Conventional | 56 | 54 | 55 | 55 | 57 |
|  | Present Invention | 86 | 90 | 84 | 88 | 91 |

In Table 2, the figures in parentheses of the light output time mean off-time periods of an LED.

From Table 2, it can be seen that the AC light emitting device according to the present invention has a significantly increased light output time of the LED compared with the conventional AC light emitting device, thereby reducing the flickering phenomenon.

Furthermore, in the AC light emitting device according to the present invention has improved overall optical efficiency resulting from an increase in average brightness thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A driving device for light emitting diodes (LEDs), comprising:
a free-charge part to be charged with a voltage to be supplied to a first LED of at least two LEDs, the first LED not being operated while a second LED of the at least two LEDs is operated by application of an alternating current (AC) voltage from an AC voltage source.

2. The driving device of claim 1, wherein the voltage is greater than or equal to a forward threshold voltage of the first LED, and the free-charge part is configured to supply the voltage to an anode-terminal of the first LED.

3. The driving device of claim 1, further comprising:
a sub-driving part to be turned on corresponding to each of a positive voltage region and a negative voltage region of the AC voltage, the sub-driving part to provide current paths for driving the at least two LEDs.

4. The driving device of claim 1, wherein the free-charge part comprises:
a first charge part to be charged with a positive voltage in a positive voltage region of the AC voltage; and
a second charge part to be charged with a negative voltage in a negative voltage region of the AC voltage.

5. The driving device of claim 4, wherein the first charge part comprises:
a first rectifier to provide a first charging path in the positive voltage region of the AC voltage; and
a first capacitor to be charged while the first rectifier provides the first charging path.

6. The driving device of claim 4, wherein the second charge part comprises:
a second rectifier to provide a second charging path in the negative voltage region of the AC voltage; and
a second capacitor to be charged while the second rectifier provides the second charging path.

7. The driving device of claim 1, further comprising:
a current control part connected between the AC voltage source and the at least two LEDs, the current control part to control a current provided to the at least two LEDs in accordance with temperature variation of the at least two LEDs.

8. The driving device of claim 7, wherein the current control part comprises a thermistor to reduce the current provided to the at least two LEDs as the temperature of the at least two LEDs increases.

9. An alternating current (AC) light emitting device, comprising:
a light emitting part comprising at least two light emitting diodes (LEDs) operable by an AC voltage from an AC voltage source; and
a driving part to drive the at least two LEDs upon application of the AC voltage, the driving part to be charged with a voltage to be supplied to a first LED of the at least two LEDs not being operated while a second LED of the at least two LEDs is operated.

10. The AC light emitting device of claim 9, wherein the voltage is greater than or equal to a forward threshold voltage of the first LED, and the driving part is configured to supply the voltage to an anode-terminal of the first LED.

11. The AC light emitting device of claim 9, wherein the driving part comprises:
a sub-driving part configured to be separately turned on corresponding to each of a positive voltage region and a negative voltage region of the AC voltage, the sub-driving part to provide current paths for the at least two LEDs; and
a free-charge part to be charged, in the positive voltage region of the AC voltage, with a voltage greater than or equal to a forward threshold voltage of the first LED, the free-charge part to supply the voltage to the first LED before operation of the first LED by application of a negative voltage after the positive voltage, and the free-charge part to be charged, in the negative voltage region of the AC voltage, with a voltage greater than or equal to a forward threshold voltage of the second LED, the free-charge part to supply the voltage to the second LED before operation of the second LED by application of a positive voltage after the negative voltage.

12. The AC light emitting device of claim 11, wherein the free-charge part comprises:
a first charge part to be charged in the positive voltage region of the AC voltage, the first charge part to supply a voltage, which is greater than or equal to the forward threshold voltage of the first LED, to the first LED before operation of the first LED by application of the negative voltage; and
a second charge part to be charged in the negative voltage region of the AC voltage, the second charge part to supply a voltage, which is greater than or equal to the forward threshold voltage of the second LED, to the second LED before operation of the second LED by application of the positive voltage.

13. The AC light emitting device of claim 12, wherein the first charge part comprises:
a first rectifier to be turned on in the positive voltage region of the AC voltage; and
a first capacitor to be charged while the first rectifier is turned on.

14. The AC light emitting device of claim 12, wherein the second charge part comprises:
a second rectifier to be turned on in the negative voltage region of the AC voltage; and
a second capacitor to be charged while the second rectifier is turned on.

15. The AC light emitting device of claim 9, further comprising:
a current control part connected between the AC voltage source and the light emitting part, the current control part to control a current provided to the light emitting part in accordance with temperature variation of the light emitting part.

16. The AC light emitting device of claim 15, wherein the current control part comprises a thermistor to reduce the current provided to the LEDs as the temperature of the LEDs increase.

17. An alternating current (AC) light emitting device, comprising:
a light emitting part comprising at least a first light emitting diode (LED) and a second LED operable by an AC voltage from an AC voltage source;
a first sub-driving part to operate the first LED in a positive voltage region of the AC voltage;
a first charge part to be charged with a positive voltage of the AC voltage during operation of the first LED, the first charge part to supply voltage to the second LED which is not operated in the positive voltage region of the AC voltage;
a second sub-driving part to operate the second LED in a negative voltage region of the AC voltage; and
a second charge part to be charged with a negative voltage of the AC voltage source during operation of the second LED, the second charge part to supply voltage to the first LED.

18. The AC light emitting device of claim 17, wherein the first sub-driving part comprises:
a first driver to provide a first current path for operation of the first LED in the positive voltage region of the AC voltage; and
a first resistor to restrict current during operation of the first LED.

19. The AC light emitting device of claim 18, wherein the first sub-driving part further comprises a current control part to control a current provided to the light emitting part in accordance with temperature variation of the light emitting part.

20. The AC light emitting device of claim 19, wherein the current control part comprises a thermistor to reduce the current provided to the light emitting part as the temperature of the light emitting part increases.

21. The AC light emitting device of claim 17, wherein the first charge part comprises:
a first rectifier to be turned on in the positive voltage region of the AC voltage; and
a first capacitor to be charged while the first rectifier is turned on.

22. The AC light emitting device of claim 21, wherein the first charge part further comprises a first charge/discharge characteristic determiner connected between the first capacitor and the AC voltage source, the first charge discharge characteristic determiner to determine at least one of a charge and a discharge characteristic of the first charge part.

23. The AC light emitting device of claim 22, wherein the first charge/discharge characteristic determiner comprises a resistor or an inductor.

24. The AC light emitting device of claim 17, wherein the second sub-driving part comprises:
a second driver to provide a second current path for operation of the second LED in the negative voltage region of the AC voltage; and
a second resistor to restrict current during operation of the second LED.

25. The AC light emitting device of claim 24, wherein the second sub-driving part further comprises a current control part to control a current provided to the light emitting part in accordance with temperature variation of the light emitting part.

26. The AC light emitting device of claim 17, wherein the second charge part comprises:
a second rectifier to be turned on in the negative voltage region of the AC voltage; and
a second capacitor to be charged while the second rectifier is turned on.

27. The AC light emitting device of claim 26, wherein the second charge part further comprises a second charge/discharge characteristic determiner connected between the second capacitor and the AC voltage source, the second charge/discharge characteristic determiner to determine at least one of a charge and a discharge characteristic of the second charge part.

28. The AC light emitting device of claim 17, wherein the voltages to be supplied to the first and second LEDs are greater than or equal to forward threshold voltages of the first and second LEDs and are supplied to anode-terminals of the first and second LEDs, respectively.

29. A method of driving at least two light emitting diodes (LEDs), the method comprising:
charging a first charge part with a voltage to be supplied to a second LED of the at least two LEDs which is not operated while the first LED of the at least two LEDs is operated by application of an alternating current (AC) voltage from an (AC) voltage source; and
discharging the charged voltage from the first charge part to the second LED before operation of the second LED by application of the AC voltage.

30. The method of claim 29, wherein the voltage is greater than or equal to a forward threshold voltage of the second LED, and is discharged to an anode-terminal of the second LED when discharging the charged voltage.

* * * * *